United States Patent Office 3,764,503
Patented Oct. 9, 1973

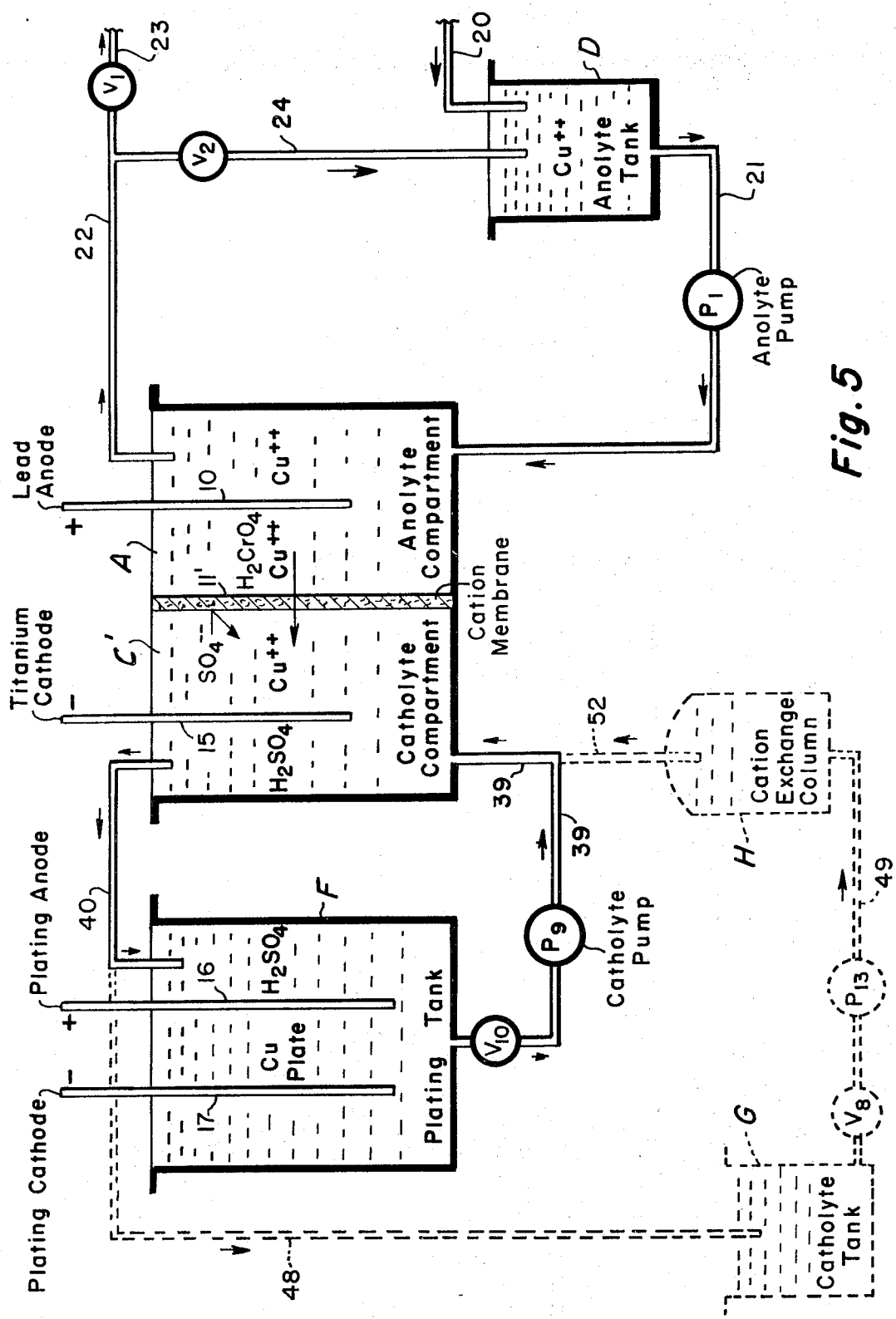

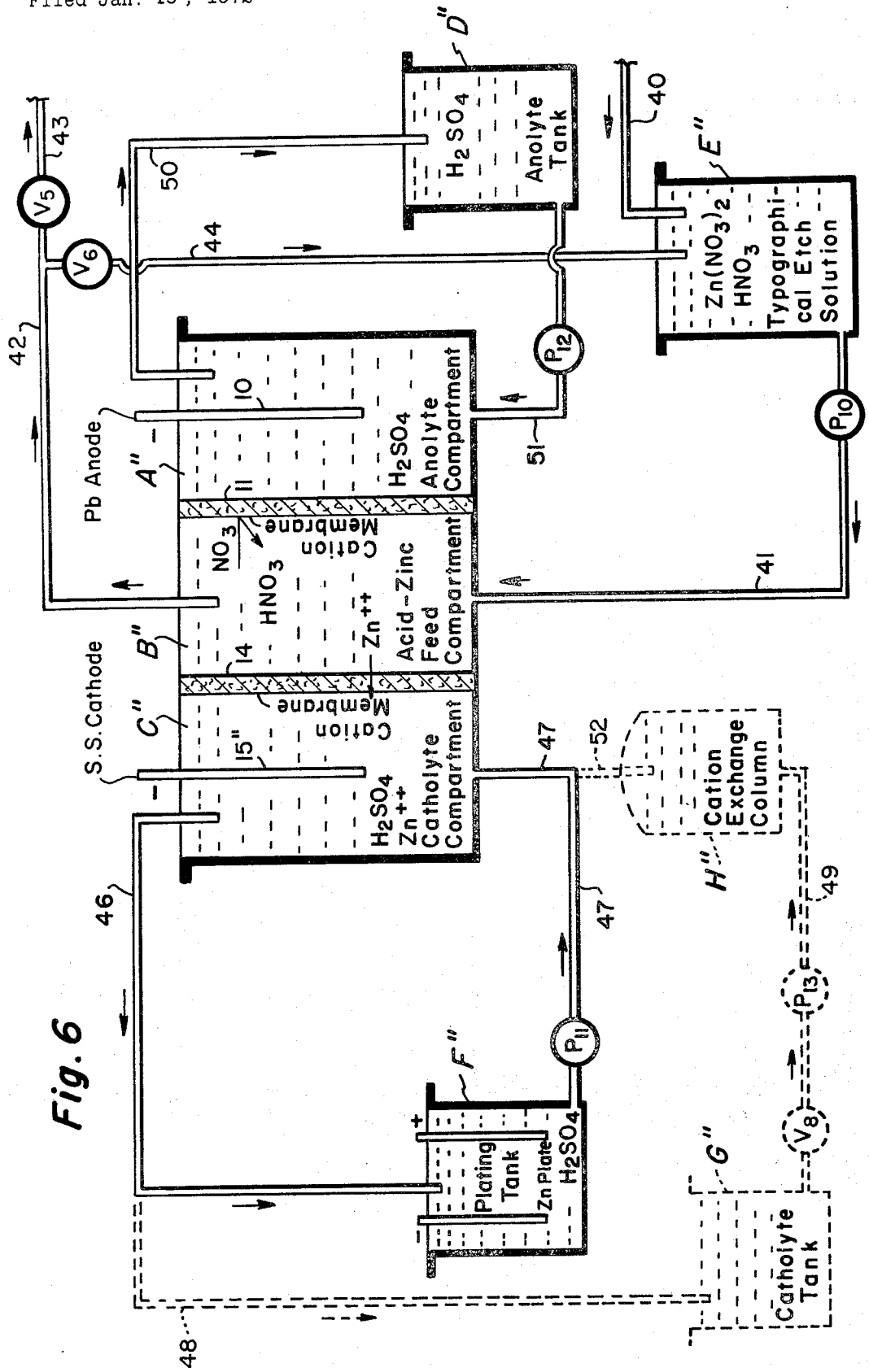

3,764,503
ELECTRODIALYSIS REGENERATION OF METAL CONTAINING ACID SOLUTIONS
Leslie E. Lancy, Ellwood City, and David C. Kruse, Pittsburgh, Pa., assignors to Dart Industries, Inc., Los Angeles, Calif.
Filed Jan. 19, 1972, Ser. No. 219,090
Int. Cl. B01d 13/02; C02c 5/12
U.S. Cl. 204—180 P
19 Claims

ABSTRACT OF THE DISCLOSURE

A used or waste acid treating solution that has been contaminated by its dissolved metal content is introduced into an anodic cell or compartment of a dialysis cell system. Metal ions are passed from the anodic compartment through a cationic permselective permeable membrane into a cathodic cell or compartment of the system. A poor efficiency of metal diffusion due to its progressive increase in concentration in the catholyte solution and the forming of uneven dendritic cathode deposits of the metal are avoided by passing the metal ions into an immediate cathodic cell that does not function to plate-out or deposit metal ions therein.

BACKGROUND OF THE INVENTION

Field of the invention

This invention relates to the reconditioning or regenerating of used, metal-contaminated, acid treating solutions and particularly, to an improved electrodialysis system or procedure for removing the soluble metal content of an acid solution and reconditioning the solution. A phase of the invention deals with the problem of providing a practical and efficient continuous electrodialysis system or procedure for recovering the dissolved metal content of and for regenerating an acid treating solution.

Description of the prior art

Acid solutions have heretofore been used to dissolve metals in cleaning operations, such as in pickling or in etching metals, to bring out design or remove unwanted metal, in deburring operations and in electropolishing, etc. Such acid solutions as employed usually have fast metal dissolution rates and as the metal concentration increases the solution reaction becomes progressively slower, such that further use of the solution becomes uneconomical relatively quickly. At this time, it has been customary to dump the used acid waste solution. However, dumping of such a solution which contains dissolved metals is an environmental pollution hazard and is wasteful from the standpoint of the acid as well as the metal content. There is a further pollution hazard even after such a solution has been neutralized for dumping, since soluble ions of the acid, such as nitrate and chloride salts that cannot be economically precipitated, are present and enter natural bodies of water.

Electrodialysis is an electrolytic system in which a permselective membrane separates anode and cathode cells, compartments or zones that may be used to separate soluble metal cations from an acid solution through a cationic type membrane to thereby maintain acid strength and lower its metal content. However, unexpected difficulties have been encountered in attempting to utilize such an approach to the problem. Smooth electrodeposits require sufficient metal ions in solution to permit uninterrupted diffusion of new metal ions through the cathode film as deposition proceeds. In this connection, it has been discovered that the metal ions, after passing through such a membrane will plate on the cathode in an erratic manner, because the solution metal content is always low in relation to the current density employed, which leads to dendritic structure, treeing of the deposit, puncturing of the membrane, a falling-off of powdery cathode material and clogging of the dialysis cell, even to the extent of shorting current flow through the electrolyte. This type of action appears to be due to the fact that the metal ion content of the catholyte is necessarily always depleted with the reasonably high current densities that are needed to diffuse the metal ions through the membrane, while at the same time, a low pH solution is needed for good conductivity, favoring the deposition of hydrogen ions. This is especially true with metals that deposit at a relatively low deposition potential, such as copper for example.

Experimental results have indicated that the metal content of the catholyte solution has a great bearing on the efficiency of metal transfer through the cathodic membrane. Also, where metals such as nickel or zinc that are not easily plated-out are involved, it has been found that as the metal content of the catholyte increases, the rate of metal diffusion through a membrane is reduced.

The above is an unexpected determination as it is contrary to theory, since the ion exchange resin cast into the plastic membrane material should not, in theory, be affected by the concentration of the metal in the catholyte. According to theory, the only factors influencing the diffusion rate are supposed to be the metal ion concentration in the anolyte or, in other words, the metal ions available at the membrane surface, the ionic activities of the various cations including the hydrogen ions which affects the pH and finally, the current density per unit area of membrane surface. However, in working on the present invention, it has been discovered that the metal content of the catholyte plays an important role.

Theoretically, it can be postulated that ion exchange through a membrane and the cast-in resin in the membrane material will occur as a two-step process, first involving the combination of the metal ion with an exchange resin and then the recombination of the resin with the hydrogen ions, releasing the metal ions to the catholyte solution. It appears that the second step is the one that is affected by the concentration of the metal ions in the catholyte or, in other words, the ionic concentration of the particular metal in the electrolyte into which it is being transferred.

SUMMARY OF THE INVENTION

In view of the above considerations, it has been an object of the present invention to develop an efficient electrodialysis process or system which will enable the continuous regeneration of acid metal treating solutions.

Another object has been to solve the problem involved from the discovery that the concentration of the metal ions in the catholyte cell or metal ion receiving zone of a dialysis system is controlling as to the successful continuation of the separation or removal of the soluble metal content of a waste acid solution and the resulting regeneration of the solution.

A further object of the invention has been to devise a procedure or system which will eliminate prior limiting factors involved in the utilization of a dialysis regeneration of a used or waste, metal-contaminated, acid-treating solution.

A still further object of the invention has been to develop a system or procedure for treating a metal contaminated pickling or etching solution which can be utilized for economically and efficiently regenerating the solution and removing and recovering its soluble metal content.

These and other objects of the invention will appear to those skilled in the art from the illustrated embodiments and the claims.

BRIEF DESCRIPTION OF THE DRAWINGS

In the drawings.

FIG. 5 is a schematic view illustrating a two-compartment or zone dialysis system also utilizing principles of the invention. This system shows an anolyte compartment that is separated from a cathode-containing catholyte compartment by a cationic membrane and whose cathode is of a type that is relatively non receptive to the deposition of metal but that is efficient in adsorbing hydrogen and releasing it. In this system, the metal content is shown as removed by an electroplating tank or compartment connected to the second or catholyte compartment.

And FIG. 6 is a schematic illustrating a three-compartment or zone dialysis system which utilizes an intermediate or second compartment for receiving the used or waste solution, and which employs an anode-containing anolyte compartment as a first compartment and a cathode-containing catholyte compartment as a third compartment, with both the first and third compartments being separated from the second or intermediate compartment by cationic membranes. This figure also shows alternate electroplating or cation exchange column means for recovering the metal content from the solution of the third compartment.

DESCRIPTION OF PREFERRED EMBODIMENTS

The problem presented has been solved by providing a procedure and means for, in effect, eliminating the short term and unsatisfactory electrodialysis plating-out in a catholyte compartment or cell which, as above pointed out, is principally due to the increase in concentration of the metal ions in the solution under operating conditions and due to the necessarily high current density with the relatively low metal ionic rate of supply through the membrane. The system or procedure of the invention eliminates uneven, dendritic, plated-out structures and enables the regeneration of the used or waste soluble metal containing acid treating solution in a continuous and efficient manner.

Figure 1:
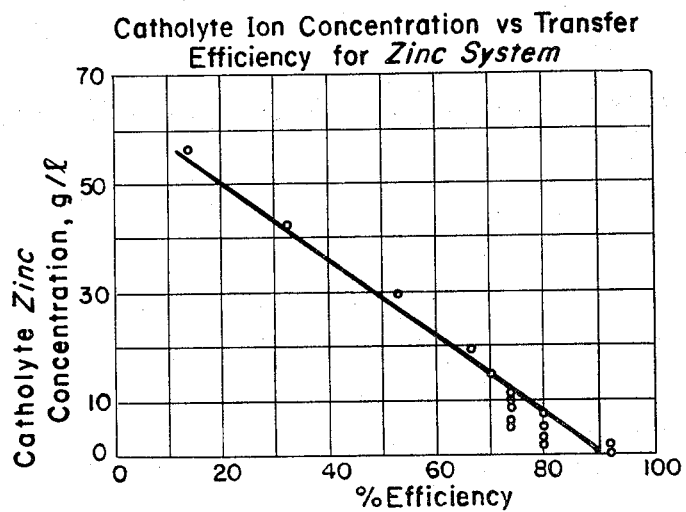
FIGS. 1, 2 and 3 are graphic charts illustrating the relationship between metal ions transferred through a cationic membrane, as compared to metal ion concentration in the catholyte, where the dissolved metal contents of the acid solutions involved are respectively zinc, nickel and copper and appear in the catholyte as the sulfates of such metals.
Figure 2:
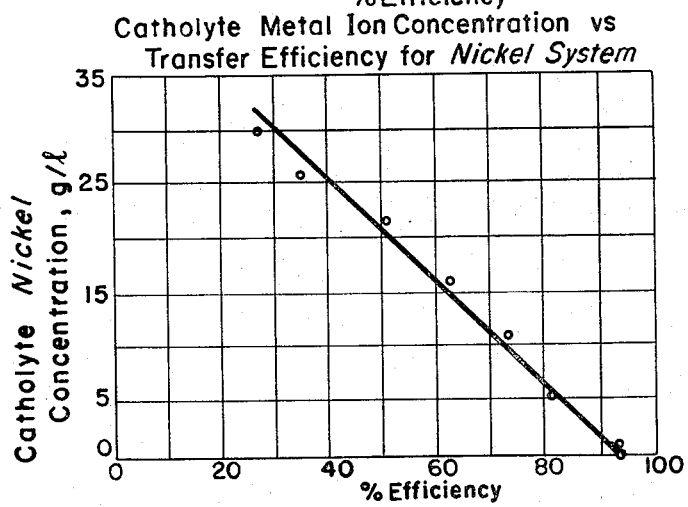
Figure 3:
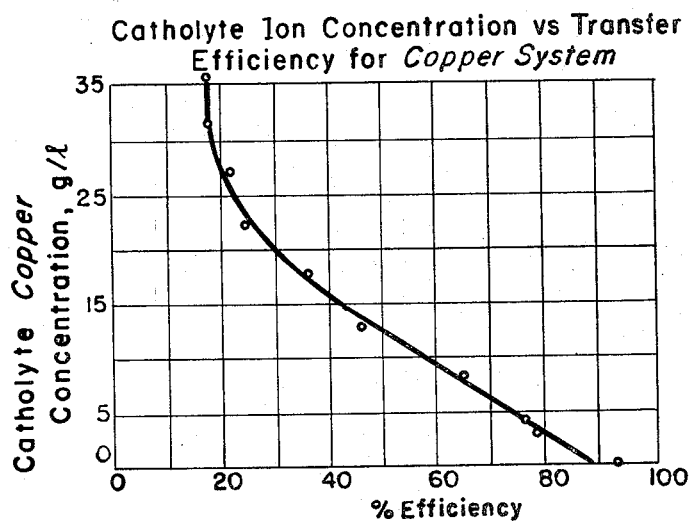

The chart of FIG. 1 of the drawings illustrates the fact that the greatest efficiency of transfer of metal ions from an anolyte to a catholyte treatment or zone is when the catholyte concentration of the metal component is at a minimum. For example, if as illustrated, zinc is the metal involved, the efficiency will decrease along a substantially straight line from a 90% value at substantially zero metal concentration to an efficiency of about 14.5% at a concentration of about 57 g./l. This same general principle applies (as shown in FIG. 2) with reference to a solution in which nickel is the soluble metal content. FIG. 2 indicates that the percentage efficiency of transfer through the catholyte membrane decreases from approximately 94% at zero percent metal concentration to about 28% for a metal concentration of about 30 g./l. The chart of FIG. 3 shows the relationship when copper is involved wherein efficiency of transfer decreases from about 88% at zero percent metal concentration to about 17.5% for a metal concentration of about 35 g./l. with a substantial straight line fall-off ending at about 20 g./l.

For purposes of illustration, three highly efficient embodiments of the invention are set forth. In one approach, see FIG. 4, a third cell or compartment is provided which contains the cathode electrode and an anionic membrane to keep the metal ions out of this third compartment and thereby avoid metal deposition. In another approach, see FIG. 5, the immediate cathodic cell is provided with a cathode plate that lacks receptiveness to or is relatively resistant to deposition of the metal but is efficient in adsorbing high quantities of hydrogen and releasing it. A third approach, see FIG. 6, is that in which the waste acid etch solution, or the reused continuously regenerated acid etch solution, enters an electrodialysis (intermediate) zone or compartment containing no electrode. Adjacent to this zone is a catholyte zone or compartment and an anolyte zone or compartment, both of which are separated from the acid-to-be-regenerated or first (intermediately positioned) zone by a cationic membrane. When electrodialysis is applied, the metal ions from the acid to be regenerated pass through the cationic membrane into the catholyte compartment, whereas no anions can pass into the anolyte compartment in view of the fact that the cation membrane blocks the passage of anions. As the metal ions are being removed from the middle or intermediate compartment, the concentration of the metal ions in the catholyte compartment increases, and to avoid plating out or to avoid increasing metal concentration, and thereby a reduced transfer rate, the catholyte is recirculated through an electrolysis cell or through a cation exchanger. No significant change in acid concentration but only metal loss occurs in the anolyte, since there is no loss of acid, and only metal ion transfer in the direction of the cathode.

In all instances, the cathodic solution may be continuously moved with the metal ions dissolved therein from an immediate cell to a separate electroplating cell which is provided with an efficient plating-out cathode and a cooperating anode. In the alternative, metal removal may also be accomplished by ion-exchange means and recirculating the metal ions containing solution through a cation exchange resin adsorption column (see FIGS. 4 and 6).

Figure 4:
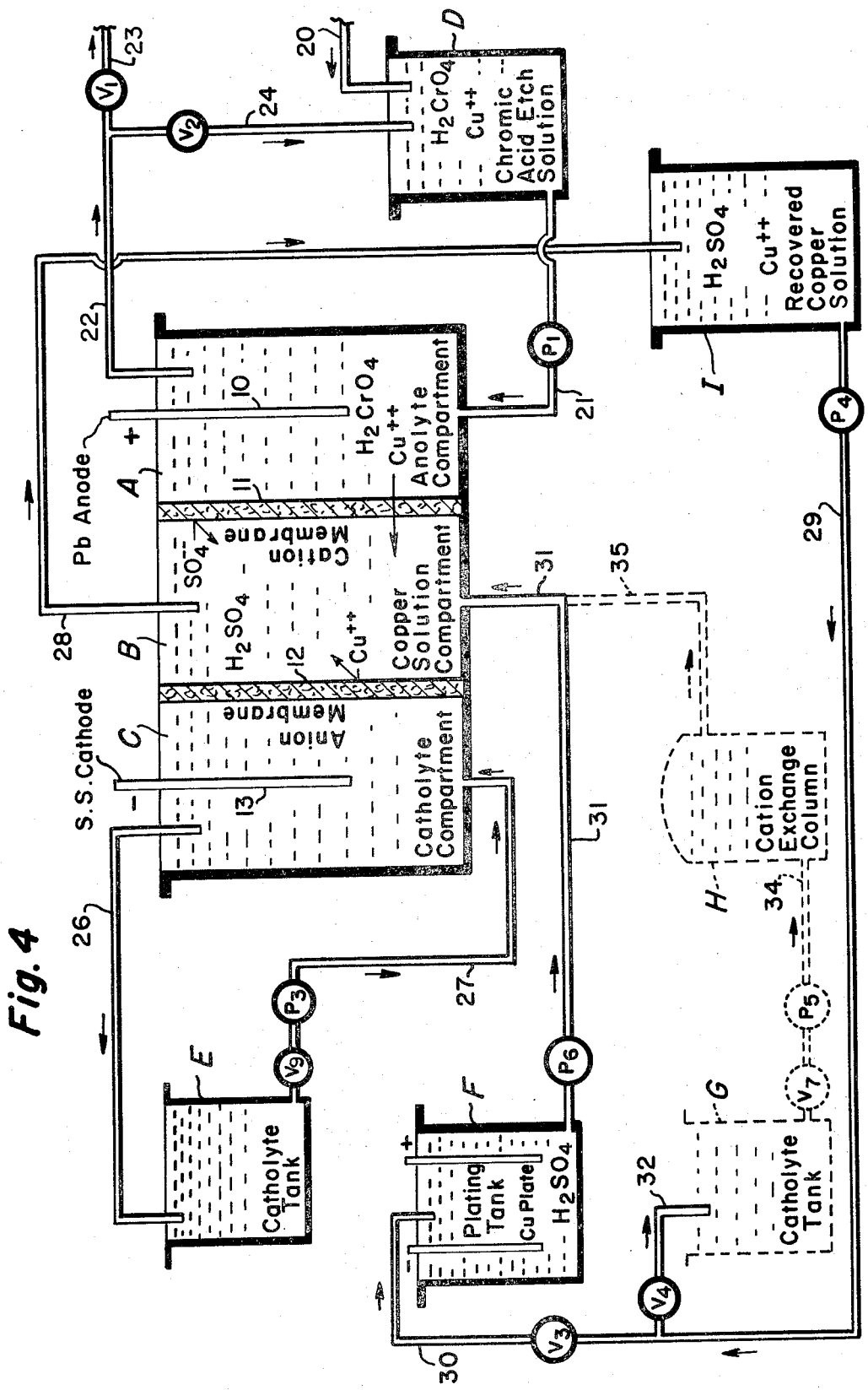
FIG. 4 is a schematic view of a three-compartment or zone dialysis system utilizing principles of the invention. It shows the use of an anionic membrane for retaining metal ions in a second compartment and keeping them out of a cathode-containing third compartment to avoid metal deposition in a third compartment. It also shows alternate plating-out and cation exchange column means that may be employed for removing the dissolved metal content of the second compartment or zone.

In FIG. 4, the aqueous waste acid treating solution, which has been used in a pickling or other metal cleaning or conditioning type of operation, and which has been contaminated by metal dissolved therein, is introduced into the system through a line 20. As shown, the line 20 discharges into an anolyte holding tank D and is then moved at any desired rate from the tank D through line 21 by a pump $P_1$ into the bottom of an anolyte first zone or compartment A of the system. The compartment A has an anode 10 of a suitable metal, such as lead, for electrically energizing the cell and, in combination with a cathode 13 in a third zone or compartment C, causing cathodic metal ions to move therefrom through a perm-selective cationic membrane 11. As shown, the membrane 11 is interposed between anolyte compartment A and an intermediate, second zone or compartment B. The aqueous acid solution, with its dissolved metal content at least reduced, is then shown as being moved from the anolyte compartment A through a discharge line 22. If sufficiently regenerated, the solution may then be passed through control valve $V_1$ and line 23 back for re-use in a metal processing line or system. A portion or all of the regenerated solution from the line 22 may be passed into return line 24 past valve $V_2$ into the holding tank D. In this manner, the concentration of the solution being introduced through line 20 may be diluted by returning solution from line 24.

The metal ions are retained in the intermediate or second compartment B, since an anionic membrane 12 is interposed between it and the third compartment C which contains a catholyte solution and a conventional cathode 13.

Since in the system of FIG. 4, there is no plating-out accomplished in the third zone or compartment C, the problem of the limiting effect of a build-up of metal cations or irregular plating of such ions on the cathode does not arise. It will be noted that the anion membrane 12 prevents the movement of metal ions from the compartment B into the compartment C. The acid content of the solution (about 10%), the absence of plating metal (Cu), and current density conditions chosen are such that plating-out cannot occur. The solution in the compartment C may be of a suitable acid content, such as sulfuric acid, and circulation may be accomplished between it and a holding tank E by means of a discharge flow line 26, a valve $V_9$, a return flow line 27 and a pump $P_3$.

The metal content of the solution in the tank, compartment or zone B may, as shown in FIG. 4, be either plated-out within an external, auxiliary or supplemental zone represented by a conventional plating tank, compartment or zone F having a conventional anode and cathode, or by a conventional cation exchange removing column H. When valve $V_3$ is open and valve $V_4$ is closed, the circulation of solution is from output line 28 of the compartment B into holding tank I, through pump $P_4$ and along lines 29 and 30 into the plating compartment F. The return flow is through pump $P_6$ and line 31 back to the compartment B. On the other hand, when the valve $V_3$ is closed and the valve $V_4$ is open, the flow is through the line 29 and valve $V_4$ into line 32 and catholyte holding tank G. From the tank G, the flow is through valve $V_7$, pump $P_5$, along line 34 into and through cation exchange column H, and along lines 35 and 31 back to the compartment B.

In the system shown in FIG. 5, the introduction of the used or waste solution is directly to an anolyte compartment A and the flow of the treated solution is the same as previously described in connection with the embodiment of FIG. 4 from the standpoint of the anolyte compartment A and the anolyte holding tank D. However, copper has been shown as the contaminating metal. Thus, similar reference numerals have been applied to this portion of the system of FIG. 5. However, in FIG. 5 only two dialysis compartments A and C′ are used and a cathode 15 of a particular type is used in the catholyte compartment C′ which is separated from the anolyte compartment A by a cationic membrane 11′. Although there is a flow of metal ions into the compartment C′, control is effected by utilizing a cathode in this compartment that is fully effective from the standpoint of enabling a flow of metal cations therein but which has little affinity for receiving a metallic deposit. In this category, platinum, platinized platinum or graphite, and titanium have been found to be satisfactory. Such a type of cathode is highly efficient from the standpoint of adsorbing high quantities of hydrogen and of releasing such hydrogen as is evolved, so that the solution film in the zone C′ is not in contact therewith.

The removal of the metal ion content is accomplished within an external, auxiliary or supplemental electroplating tank, compartment or zone F which may be of a conventional construction having conventional anode and cathode electrodes 16 and 17. It will be noted that to plate-out the metal in the zone F, there must be assurance of no plating-out of the metal content in compartment C′. Continuous plating-out is effected by moving the solution from the compartment C′ throughout line 40 into the plating tank F. The solution is returned through control valve $V_{10}$, pump $P_9$ and line 39.

In the system illustrated in FIG. 6, three compartments A″, B″ and C″ are employed and the used waste solution is introduced into the second or intermediate compartment B″, instead of into the first or anolyte compartment A″. Also in this arrangement, the anolyte compartment A″ contains a conventional anode 10 such as a lead anode and is separated from the intermediate compartment by a cationic membrane 11. Further, intermediate compartment B″ is separated from the third and catholyte compartment C″ by a cationic membrane 14, and the latter compartment has a cathode 15″ of a suitable metal such as stainless steel. Thus, dialysis is set up through the agency of the anode 10 in the first compartment A″ and the cathode 15″ within the third compartment C″. The acid electrolyte is recirculated into the tank, zone or compartment A″ to flow into and out of a holding tank D″ from output line 50 and back through pump $P_{12}$ and return line 51. The membrane 11 prevents the passage of acid from the compartment A″ into the compartment B″ and, vice versa.

The reconditioned used solution, as in the system of FIG. 4, may be first circulated fully between a holding tank E″ and compartment B″, may be proportioned in flow therebetween, or may later when full operation is attained, be directly returned as a reconstituted solution through the line 43. As illustrated, input of the used solution is introduced through line 40 into the holding tank E″, and then is moved through line 41 into the intermediate compartment B″ by pump $P_{10}$. Outflow from the compartment B″ is through outflow line 42 and then into one or both of the lines 43 and 44, as controlled by valves $V_5$ and $V_6$. Flow through line 44 is back to the holding tank E″, a return flow of the reconstituted solution to the process line is through valve $V_5$ and line 43.

If the cathode 15″ is of a type that is conducive to the plating-out of the metal ions received within the third tank C″, then the flow may be effected between it and a catholyte holding tank such as E of the system of FIG. 4. However, where as illustrated, the cathode 15″ is employed in the manner of the cathode 15 of the system of FIG. 5 essentially as a non-plating cathode, then the metal ions may be, as in the case of the system of FIG. 4, either in an external, auxiliary or supplemental zone or system, plated-out in a conventional electroplating tank, zone or compartment F″ or removed by a conventional cation exchange column H″. In FIG. 6, the solid connecting lines represent the electroplating part wherein outflow from the tank C″ is along the line 46 into the electroplating tank F″, with the metal removed solution being returned by pump $P_{11}$ through line 47. The dot and dash lines of the same figure illustrate an alternate system wherein the outflow is through line 46 to line 48 into the catholyte holding tank, compartment or zone G″ and then from such tank through control valve $V_8$ as moved by pump $P_{13}$ along line 49 into and through cation exchange column H″ and along lines 52 and 47 back to the compartment C″.

There are some metal ions that have a low deposition potential as referred to hydrogen deposition, such as copper, silver, etc. To avoid plating-out these metals, a cathode metal has to be chosen of a material that is non-receptive to or that resists metal deposition. Such a material may be platinum, titanium, platinized platinum or platinized graphite, etc. Some metals will plate out only at higher concentrations of metal or lower concentrations of acid. To avoid plating such metals out and, in this category are zinc and nickel, either the metal content has to be kept low or the acid content has to be high. This is the reason why an approximately 10% acid solution and an approximately 2 g./l. of metal content have been chosen to aid the external plating zone or system, or only 1.0% acid with approximately .5 gram maximum zinc content when using an external ion exchanger.

When attempting to remove metals from a used acid solution where the metals involved cannot be plated-out of an aqueous system, such for example as aluminum, the external removal of the metal to maintain a low metal content in the catholyte has to be an external ion exchanger or column.

High current density on the cathode 15 of the system of FIG. 5 will assist in the previously stated aim, in that it has with the relatively high acid content, a very low over-voltage for hydrogen and avoids plating-out the metal ions within the second compartment or zone B. The catholyte solution is illustrated as a sulfuric acid aqueous solution to correspond to the solution in the compartment C'' of the embodiment of FIG. 6. As show in FIG. 5, the tank G has both a plating anode 16 and a plating cathode 17, and the cathode plate 17 may be provided with a large cathode surface area to effect low current density plating and smooth and non-dendritic deposits thereon.

The systems of the invention enable the elimination of physical and practical limitations in the use of a dialysis type of cell, and enable a continuous operation in which an acid metal etching or pickling solution may be regenerated and recirculated to economically use its acid content over and over, and continuously eliminate its pick-up of dissolved metal. The metal thus picked-up, of course, in accordance with the operation of the present invention, is plated-out or recovered and thus may be conserved for such usage as may be advantageous.

The following represent examples of solution contents that may exist in typical systems of the invention that have been illustrated:

(I)

Three-compartment electrodialysis cell using a cation membrane to separate anolyte and intermediate compartments and an ion membrane to separate a catholyte and the intermediate compartment—see FIG. 4

(a) In the process, a copper containing chromic acid used aqueous etching solution, as introduced through line 20, may have a content of about 200 to 250 g./l. of chromic acid, Cr 6+ as $CrO_3$ and about 10 to 15 g./l. of copper.

(b) The aqueous catholyte for the electrolytic recovery part of the system may contain about 50 to 100 g./l. of $H_2SO_4$, about 200 mg./l. to 1 g./l. of copper and employ a current density of about 0.5 to 1 amp/dm.$^2$ (5 to 10 a.s.f.).

(c) Lead anode or anodes and stainless steel or copper cathodes may operate at a temperature of about 65 to 70° C.

(d) The aqueous catholyte for the ion exchange part of the system may contain about 4 to 10 g./l. of sulfuric acid and about 300 to 500 mg./l. of copper.

(e) The acid and copper concentration will depend on whether electrolytic or ion exchange external removal is being utilized. The aqueous catholyte in the compartment B may contain about 4 to 150 g./l. of sulfuric acid.

(II)

Two-compartment electrodialysis cell using cation membrane, lead anode and titanium cathode—see FIG. 5

(a) The aqueous used waste solution may contain chromic acid, Cr 6+ as $CrO_3$ in the amount of about 200 to 250 g./l. and dissolved copper in the amount of about 10 to 15 g./l.

(b) The aqueous catholyte for the electrolytic recovery part of the system may contain sulfuric acid in the amount of about 50 to 100 g./l., copper in the amount of about 200 mg./l. to 1 g./l. and employ a current density of about 0.5 to 1 amp/dm.$^2$ (5 to 10 a.s.f.).

(c) The lead anodes 10 and the titanium cathode 15 may operate at a temperature of about 65° to 70° C.

(d) If, for a copper content, an ion exchange recovery part (similar to that shown in FIGS. 4 and 6) is used, the aqueous catholyte for the ion exchange part may contain sulfuric acid in the amount of about 4 to 10 g./l. and copper in the amount of about 300 to 500 mg./l.

(e) The above process as applied to an aluminum metal contaminated used acid or waste solution may have a waste solution content of chromic acid, Cr 6+ as $CrO_3$ in the amount of about 250 to 300 g./l. and aluminum in the amount of about 10 to 15 g./l.

(f) An ion exchange metal recovery part (electroplating not possible for an aluminum content) may have an aqueous content of sulfuric acid of about 4 to 10 g./l. and of aluminum of about 300 to 500 mg./l.

(III)

Three-compartment system for electrodialysis using two cation membranes, sulfuric acid anolyte and catholyte, lead anode and a stainless steel cathode (a) A typical aqueous used etching solution may contain nitric acid in the amount of about 26% by volume or 244 g./l. and dissolved zinc in the amount of about 30 g./l.

(b) Using an external electrolytic recovery with the recirculating catholyte solution from compartment C'', the aqueous catholyte may have an aqueous sulfuric acid solution content of about 50 to 100 g./l. and zinc content of about 1 to 2 g./l. using lead anodes 10 and stainless steel cathodes 15'.

(c) Using the external ion exchange recovery part of the system for removing the metal content of the aqueous catholyte solution in compartment C'', the sulfuric acid content of the aqueous circulated solution may be about 4 to 150 g./l. and the zinc content about 300 to 800 mg./l.

Summarized briefly, the heretofore limiting characteristics of an electrodialysis system have been eliminated to enable an efficient, continuous, reconditioning of an aqueous waste acid solution, as distinguished from a one-shot interrupted type of operation. The operation is further accomplished in such a manner that the metal content may be plated-out for its recovery, and an undesirable type of metal build-up on a cathode may be at least minimized. Finally, the operation is accomplished with an increased efficiency and effectiveness of metal ion removal from a dissolved condition in a high acid content type of processing solution.

In the system of FIG. 5, like in the system of FIG. 4, an alternate external auxiliary or supplemental metal ion removing zone or system is shown, as represented by dotted lines. That is, the removal may, instead of being effected by the plating tank F, be provided by shunting-out the electroplating zone or system and moving the electrolyte from compartment B' through outlet line 40 into line 48, catholyte tank G, past valve $V_8$, along line 48, through pump $P_{12}$, and into cation exchange column H. The solution with metal ion content removed is then passed along lines 49 and 39 back into the zone or compartment B'.

A cathode 15, such as employed in the system of FIG. 5, should have a low over voltage for hydrogen to thereby effectively adsorb high quantities of hydrogen and release it in such a manner that the solution is relatively out of contact with the cathode means. It will be noted that the system of FIG. 5 shows the exemplary use of titanium cathodes in its catholyte compartment C' and that the systems of FIGS. 4 and 6 exemplify the use of a stainless steel cathode means in their respective catholyte compartments C and C''. It will be further noted that the aqueous acid solution of compartment C of the system of FIG. 4 is not contaminated by metal ions due to the use of the permselective anion membrane 12 between its compartment and the second dialysis compartment B.

In accordance with a basic employment of the invention, the use aqueous acid metal treating solution that has been contaminated with metal dissolved therein is introduced into one dialysis compartment of at least a two compartment dialysis system. The other dialysis compartment or compartments each contain a suitable aqueous acid solution; the solutions of the dialysis compartments are electrically energized by cooperating anode and cathode means; and metal ions are passed from the aqueous used or waste acid solution in the one dialysis compartment into the solution of a second dialysis compartment through a permselective cation membrane to thus recondition the used solution within the one dialysis compartment. The used solution in the one compartment is shown recirculated by passing it through a holding tank, and the reconditioned used solution may be continuously removed from the one dialysis compartment for reuse in acid treating metal workpieces in a processing line. The aqueous solution in the second dialysis compartment containing metal ions that have been passed from the one dialysis compartment is, itself, reconditioned by either electroplating-out the metal content within an external system or by removing such content within a cation exchange column of the external system. The aqueous solution after the removal of the metal ion content within the external system is then returned to the second dialysis compartment for reuse therewithin.

The second dialysis compartment within which the metal ions are passed through the membrane from the one dialysis compartment may be directly energized by cathode means placed therein or indirectly energized by cathode means placed in an adjacent dialysis compartment and separated therefrom by a permselective anion membrane and, of course, having a suitable aqueous acid solution therein. In the first instance, the cathode means is of a metal ion pick-up inhibiting or restricting type and in the second instance, metal ions are prevented from entering the solution of the catholyte compartment within which the cathode means is positioned by the permselective anion membrane. A continuous movement of the metal ion containing solution from the second dialysis compartment also checks the efficiency limiting effect on metal cation movement through the cation membrane from the one dialysis compartment of an increasing concentration of metal ions within the second or receiving dialysis compartment. In the embodiments of FIGS. 4 and 5, reconstituting acid may, when desired, be added to the used or waste aqueous metal treating acid solution being introduced to the dialysis reconditioning system through the agency of the holding tank, compartment or bath D. In the embodiment of FIG. 6, this may also, when desired, be accomplished through the agency of the holding tank E''.

If, for example, a cathode cell is being used for the separation out of metal ions, such as copper, silver or gold that will plate out at a very low ionic concentration, due to the fact that the metal over-voltage (deposition potential) is lower than the over-voltage for hydrogen (deposition potential for hydrogen), a special cathode (see FIG. 5) is used to avoid plating out in a powdery or dendritic form before there is an opportunity to remove the metal ions through recirculation from the cathode cell for depositing them in an external cell or for collecting them on a cation exchange resin of an external cation exchange column.

If, on the other hand, the metal ions to be transferred into the cathode cell or catholyte compartment are of a type that have a higher over-voltage (deposition potential) than the over-voltage for the deposition of hydrogen, conditions should be controlled in order that metal deposition will not occur because only hydrogen is deposited. Metals of this type are, for example, zinc and nickel. To insure a high over-voltage for the metal and a lower over-voltage for the hydrogen deposition, the acid concentration is kept reasonably high and the metal concentration reasonably low. In such a situation, a special cathode metal is not needed (see FIG. 6).

A third type of metal is one that cannot be deposited from an aqueous system as, for example, aluminum or titanium. Such a metal can be removed from the cathode cell or catholyte compartment only by capturing the metal ions on a cation exchange resin or by wasting the catholyte and neutralizing the excess acid. Finally the metal salts may be precipitated to maintain a low metal content continuously in the catholyte solution.

With reference to, for example, the holding tank or compartment D of the system shown in FIGS. 4 and 5, and holding tank or compartment E'' of the system shown in FIG. 6, acid need not ordinarily be added to the used or waste solution, but the solution is recirculated at a desired rate between the holding tank and the electrodialysis compartment for the purpose of: (1) maintaining a reasonably uniform solution composition having metal ions in it to be removed, and (2) replenishing the solution film on the membrane surface which could become impoverished of metal ions if solution recirculation is not practiced. It will be noted that such circulation agitates the solution and provides a continuous supply of metal ions. With a thin film in contact with the membrane, and with the realization that the metal content in such film is the only area from which metal ions can be transferred into the ion exchange resin embedded in the membrane, it will be appreciated that as the electrodialysis progresses, the metal content of the film is reduced. Slowly from the body of the solution, more metal will diffuse into this film. Working with reasonably high current densities, if the film is impoverished in metal ions, the efficiency of ion transfer will be impaired due to the fact that removal is faster than the diffusion. This is the reason why replenishment of solution on the surface is important. This is accomplished, as indicated, through pumping and recirculation.

On the other hand, the catholyte solution is recirculated to maintain a low metal content by external metal removal and to bring back a solution that, through external means of either electrodialysis or ion exchange, is depleted of metal. The acid concentration is not changed by acid addition in either case. The free acid content is increased by the metal removal, but the total acid ion concentration is not affected. In a system such as illustrated in FIG. 7, the cathode 15 is used or operated preferentially towards or in such a manner as to favor hydrogen deposition over metallic deposition, whereby movement of the catholyte solution into the external system assures metal ion removal or pick-up externally of the dialysis system.

We claim:

1. In a dialysis procedure for regenerating a used metal treating aqueous acid solution that has been reduced in effectiveness by the presence of a dissolved metal content therein, the improvement which comprises, introducing the used solution into one dialysis compartment, providing at least a second dialysis compartment that is adjacent to the one compartment and that contains a second aqueous acid solution therein, electrically energizing the solutions in the compartments by cooperating anode and cathode means while inhibiting plating of the metal ion content of the used solution on the cathode means, removing metal ions from the used solution in the one dialysis compartment by passing them therefrom through a permselective membrane into the second dialysis compartment, and moving the second aqueous solution with its metal ion content from the second dialysis compartment into an external system and therein removing the metal ion content therefrom.

2. In a procedure as defined in claim 1, reconditioning the used solution by removing metal ions therefrom within the one dialysis compartment while recirculating the solution by moving it between the one compartment and a holding tank, and removing reconditioned used solution from the one compartment for reuse.

3. In a procedure as defined in claim 1, introducing the used solution through a holding tank into the one dialysis compartment and removing the reconditioned used solution directly from the one dialysis compartment.

4. In a procedure as defined in claim 1, inhibiting movement of acid ions from the one dialysis compartment into other dialysis compartments by cation permselective membrane means.

5. In a procedure as defined in claim 1, removing the metal ion content of the solution in the external system by electrolytically depositing it on cathode means.

6. In a procedure as defined in claim 1, removing the metal ion content of the solution in the external system compartment by passing it through a cation exchange column.

7. In a procedure as defined in claim 1, returning the second aqueous solution to the second dialysis compartment after its metal ion content has been removed within the external system.

8. In a procedure as defined in claim 1, providing a third dialysis compartment that contains an aqueous acid solution therein, employing the third compartment as a catholyte compartment, employing the second dialysis compartment as an intermediate metal ion collecting compartment separated from the third compartment by an anion membrane and separated from the one compartment by a cation membrane, and employing the first compartment as an anolyte compartment.

9. In a procedure as defined in claim 1, providing a third dialysis compartment that contains an aqueous acid solution therein, employing the third compartment as an anolyte compartment separated from the one dialysis compartment by a cation membrane, employing the one dialysis compartment as an intermediate compartment separated from the second compartment by a cation membrane, and employing the second compartment as a catholyte compartment.

10. In a procedure as defined in claim 1, utilizing the second dialysis compartment as a catholyte compartment by providing the electrically energized cathode means therein, and maintaining the cathode means in a plating-out restraining condition with respect to the metal ion content within the aqueous solution of the catholyte compartment.

11. In a procedure as defined in claim 10, continuously removing reconditioned used aqueous acid solution from the one dialysis compartment for reuse.

12. In a procedure as defined in claim 10, restraining the plating-out action in the catholyte compartment by utilizing cathode means therein of the class consisting of titanium, platinum, platinized platinum and platinized graphite that has a low over-voltage for hydrogen to therein effectively adsorb high quantities of hydrogen and release it in such a manner that hydrogen deposition is favored over metallic deposition.

13. In a procedure as defined in claim 1, providing a third dialysis compartment containing a third aqueous acid solution therein and separated from the second dialysis compartment by a permselective membrane that passes electrical energy therethrough and that blocks the passage of metal ions therethrough from the second compartment, and employing the third dialysis compartment as a catholyte compartment having the electrically energized cathode means therein.

14. In a procedure as defined in claim 1, employing the one dialysis compartment as an anolyte compartment having the electrically energized anode means therein, employing the second dialysis compartment as a catholyte compartment having the electrically energized cathode means therein, restraining plating deposition-out of the metal ion content in the catholyte compartment and, at the same time, effectively checking the efficiency limiting effect on cation movement through the membrane of an increased concentration of metal ions within the aqueous solution of the catholyte compartment.

15. In a procedure as defined in claim 1, providing a third dialysis compartment containing a third aqueous acid solution therein and that is separated from the one dialysis compartment by a permselective cation membrane, and employing the third dialysis compartment as an anolyte compartment having the electrically energized anode means therein.

16. In a procedure as defined in claim 15, employing the second dialysis compartment as a catholyte compartment having the electrically energized cathode means therein and separated from the first dialysis compartment by a perselective cation membrane.

17. In a procedure as defined in claim 1, utilizing the one dialysis compartment as an intermediate compartment, utilizing the second dialysis compartment as a catholyte compartment by providing the electrically energized cathode means therein, providing a third dialysis compartment containing a third aqueous acid solution therewithin and utilizing it as an anolyte compartment by providing the electrically energized anode means therein, providing a cation membrane between the intermediate and the anolyte compartments and a cation membrane between the intermediate and the third compartments, and after removing the metal ion content from the catholyte solution within the external system, returning it to the catholyte compartment.

18. In a procedure as defined in claim 1, continuously reconditioning and moving the used aqueous acid solution through the one dialysis compartment during the defined procedure, and reconstituting the used aqueous acid solution with a substantially reduced dissolved metal content for reuse in a metal processing line.

19. In a procedure for regenerating a used metal treating aqueous acid solution that has been reduced in effectiveness by the presence of a dissolved metal content therein, the improvement comprising, moving the solution into one dialysis compartment having an electrically active anode cooperating therewith, selectively moving metal ions of the dissolved metal content of the used acid solution from the one dialysis compartment through a permselective cathodic membrane into an aqueous acid solution of a second dialysis compartment having an electrically active cathode cooperating therewith, restraining plating deposition-out of the metal ion content of the solution in the second dialysis compartment and, at the same time, effectively checking the efficiency limiting effect on cation movement through the membrane of an increased concentration of metal ions within the solution of the second dialysis compartment by continuously moving the metal ion containing solution out of the second compartment into an external zone and accomplishing removal of metal ion content from the solution within the external zone, and continuously returning the solution from which the metal ion content has been removed to the second compartment.

References Cited
UNITED STATES PATENTS

| | | | |
|---|---|---|---|
| 3,124,520 | 3/1964 | Juda | 204—86 |
| 3,347,761 | 10/1967 | Bjcek | 204—180 P X |
| 3,481,851 | 12/1969 | Lancy | 204—180 P |

JOHN H. MACK, Primary Examiner

A. C. PRESCOTT, Assistant Examiner

U.S. Cl. X.R.

204—151, 301